US007007956B1

(12) United States Patent
Pinon

(10) Patent No.: US 7,007,956 B1
(45) Date of Patent: Mar. 7, 2006

(54) HARNESS DEVICE, KIT AND METHOD OF USING SAME

(76) Inventor: Phillip J. Pinon, 14512 Westfall Rd., Tustin, CA (US) 92780

( * ) Notice: Subject to any disclaimer, the term of this patent is extended or adjusted under 35 U.S.C. 154(b) by 0 days.

(21) Appl. No.: 10/787,453

(22) Filed: Feb. 26, 2004

(51) Int. Cl.
*B62D 51/04* (2006.01)

(52) U.S. Cl. .................. 280/1.5; 280/24; 280/DIG. 11; 224/184

(58) Field of Classification Search .................. 280/1.5, 280/47.131, 24, 19, 204, 292, DIG. 6, DIG. 11; 224/184, 197, 660, 666, 668
See application file for complete search history.

(56) References Cited

U.S. PATENT DOCUMENTS

| 504,712 | A |   | 9/1893 | Crull |        |
|---------|---|---|--------|-------|--------|
| 1,312,990 | A |   | 8/1919 | Johnson |      |
| 3,328,043 | A | * | 6/1967 | Johnson | 280/1.5 |
| 3,926,448 | A | * | 12/1975 | Reichard | 280/1.5 |
| 5,062,651 | A |   | 11/1991 | Varieur |      |
| 5,215,318 | A | * | 6/1993 | Capraro | 280/1.5 |
| D346,141 | S |   | 4/1994 | McConnell |   |
| 5,375,861 | A |   | 12/1994 | Gifford |    |
| 5,511,802 | A |   | 4/1996 | Aitken |     |
| 5,884,920 | A |   | 3/1999 | Seto |        |
| 6,098,993 | A |   | 8/2000 | Bellinson |   |
| 6,349,949 | B1 |   | 2/2002 | Gorringe |    |
| 6,431,556 | B1 | * | 8/2002 | Beardsley et al. | 280/1.5 |

* cited by examiner

Primary Examiner—Tony Winner

(57) ABSTRACT

A harness device, an associated kit and a method of using same are described for use in allowing a user to push an attached stroller without the need for the user's arms while simultaneously dampening undesirable up and down vertical rocking motions on the stroller which may be brought about from strides of the user walking, jogging or running. The device includes the interconnected elements of a clamp; a joining bar; a ball joint; an elongated vertical slot joint; a base plate; a waist belt; a first belt coupler; and a second belt coupler. The kit includes the unassembled components of the device. The method of using same includes the steps of affixing, grabbing, grasping; jogging, locking, obtaining, placing, pushing, running, sliding, walking, and wrapping.

20 Claims, 4 Drawing Sheets

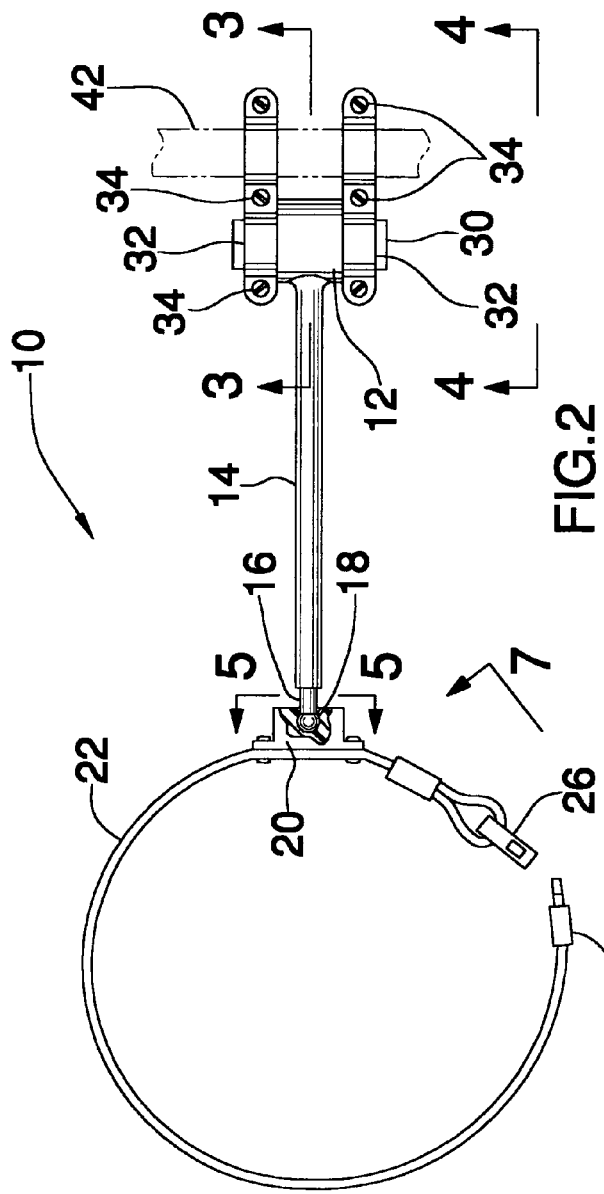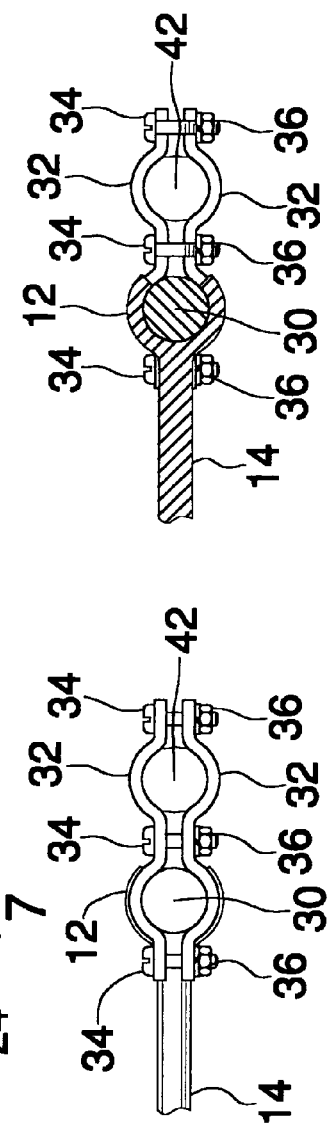

HARNESS DEVICE, KIT AND METHOD OF USING SAME

FIELD OF THE INVENTION

The present invention relates harnesses, more particularly to a human harness, an associated kit, and a method of using same for use in providing a convenient means for allowing a user to push an attached stroller without the need for the user's arms while simultaneously dampening undesirable up and down vertical rocking motions on the stroller which may be brought about from strides of the user walking, jogging or running.

BACKGROUND OF THE INVENTION

Walking, jogging, and running are unquestionably healthy activities. Unfortunately, these activities may be substantially restricted when one is a parent of a infant. Strollers provide a modicum of relief, however most strollers require a user to hold onto the stroller and thus may compromise the runner's stride. Push rods coupled to a user which in turn is coupled to a strollers suffer from a vertical bouncing of the stroller when the user increases his stride. This vertical bouncing may become uncomfortable to the infant transported within the stroller.

A wide variety of harness devices is currently available on the commercial market and an even larger number of these types of devices are known in the art of harness devices, for example, the propelling attachment for garden plows disclosed by Crull in U.S. Pat. No. 504,712; the wheelbarrow disclosed by Johnson in U.S. Pat. No. 1,312,990; the jogging baby carriage disclosed by Varieur in U.S. Pat. No. 5,062,651; the no-hands baby stroller disclosed by Gifford in U.S. Pat. No. 5,375,861; the single wheel baby stroller disclosed by Aitken in U.S. Pat. No. 5,511,802; the infant carrier for rough terrain disclosed by Seto in U.S. Pat. No. 5,884,920; the attachment for a baby stroller disclosed by Bellinson in U.S. Pat. No. 6,098,993; the baby stroller harness for joggers disclosed by Gorringe in U.S. Pat. No. 6,349,949; and the stroller accessory bar disclosed by McConnel in U.S. Pat. No. D346,141.

While all of the above-described devices fulfill their respective, particular objectives and requirements, the aforementioned patents do not describe a harness device having the interconnected elements of a clamp; a joining bar; a ball joint; an elongated vertical slot joint; a base plate; a waist belt; a first belt coupler; and a second belt coupler. This combination of elements would specifically match the user's particular individual needs of making it possible to provide a means for allowing a user to push an attached stroller without the need for the user's arms while simultaneously dampening undesirable up and down vertical rocking motions on the stroller which may be brought about from strides of the user walking, jogging or running. The above-described patents make no provision for a harness device having the interconnected elements of a clamp; a joining bar; a ball joint; an elongated vertical slot joint; a base plate; a waist belt; a first belt coupler; and a second belt coupler.

Therefore, a need exists for a new and improved harness device having the interconnected elements of a clamp; a joining bar; a ball joint; an elongated vertical slot joint; a base plate; a waist belt; a first belt coupler; and a second belt coupler. In this respect, the harness device according to the present invention substantially departs from the conventional concepts and designs of the prior art, and in doing so provides an apparatus primarily developed for the purpose of providing a means for allowing a user to push an attached stroller without the need for the user's arms while simultaneously dampening undesirable up and down vertical rocking motions on the stroller which may be brought about from strides of the user walking, jogging or running.

SUMMARY OF THE INVENTION

The present device, kit and method of using, according to the principles of the present invention, overcomes the shortcomings of the prior art by providing a novel and nonobvious harness device, kit and method of using the same. The device includes the interconnected elements of a clamp; a joining bar; a ball joint; an elongated vertical slot joint; a base plate; a waist belt; a first belt coupler; and a second belt coupler. The kit includes the unassembled components of the device. The method of using same includes the steps of affixing, grabbing, grasping; jogging, locking, obtaining, placing, pushing, running, sliding, walking, and wrapping.

In view of the foregoing disadvantages inherent in the known type harness devices now present in the prior art, the present invention provides an improved harness device, which will be described subsequently in great detail, is to provide a new and improved harness device which is not anticipated, rendered obvious, suggested, or even implied by the prior art, either alone or in any combination thereof.

To attain this, the present invention essentially comprises a <synopsis of Claim 1>

There has thus been outlined, rather broadly, the more important features of the invention in order that the detailed description thereof that follows may be better understood, and in order that the present contribution of the art may be better appreciated.

The invention may also include a spring lock. There are of course, additional features of the invention that will be described hereinafter and which will form the subject matter of the claims attached.

Numerous objects, features and advantages of the present invention will be readily apparent to those of ordinary skill in the art upon reading of the following detailed description of presently preferred, but nonetheless illustrative, embodiments of the present invention when taken in conjunction with the accompany drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved harness device that has all the advantages of the prior art harness device and none of the disadvantages.

It is another object of the present invention to provide a new and improved harness device that may be easily and efficiently manufactured and marketed.

An even further object of the present invention is to provide a new and improved harness device that has a low cost of manufacture with regard to both materials and labor, and which accordingly is then susceptible of low prices of sale to the consuming public, thereby making such multipurpose storage unit and system economically available to the buying public.

Still another object of the present invention is to provide a new harness device that provides in the apparatuses and methods of the prior art some of the advantages thererof, while simultaneously overcoming some of the disadvantages normally associated therewith.

Even still another object of the present invention is to provide a harness device having the interconnected elements of a clamp; a joining bar; a ball joint; an elongated vertical slot joint; a base plate; a waist belt; a first belt coupler; and a second belt coupler. The kit includes the unassembled components of the device. This combination of elements makes it possible to provide a means for allowing a user to push an attached stroller without the need for the user's arms while simultaneously dampening undesirable up and down vertical rocking motions on the stroller which may be brought about from strides of the user walking, jogging or running.

Still another object of the present invention is to provide a kit comprising the unassembled components of the device.

Lastly, it is an object of the present invention to provide a new and improved method of using comprising the steps of affixing, grabbing, grasping; jogging, locking, obtaining, placing, pushing, running, sliding, walking, and wrapping.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and description matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a top view of a preferred embodiment of the harness device of the present invention;

FIG. 3 is a cross sectional side view of a portion of a preferred embodiment of the harness device of the present invention;

FIG. 4 is a side view of a portion of a preferred embodiment of the harness device of the present invention;

The same reference numerals refer to the same parts throughout the various figures.

DETAILED DESCRIPTION OF THE PREFERRED EMBODIMENT

Figure 1:
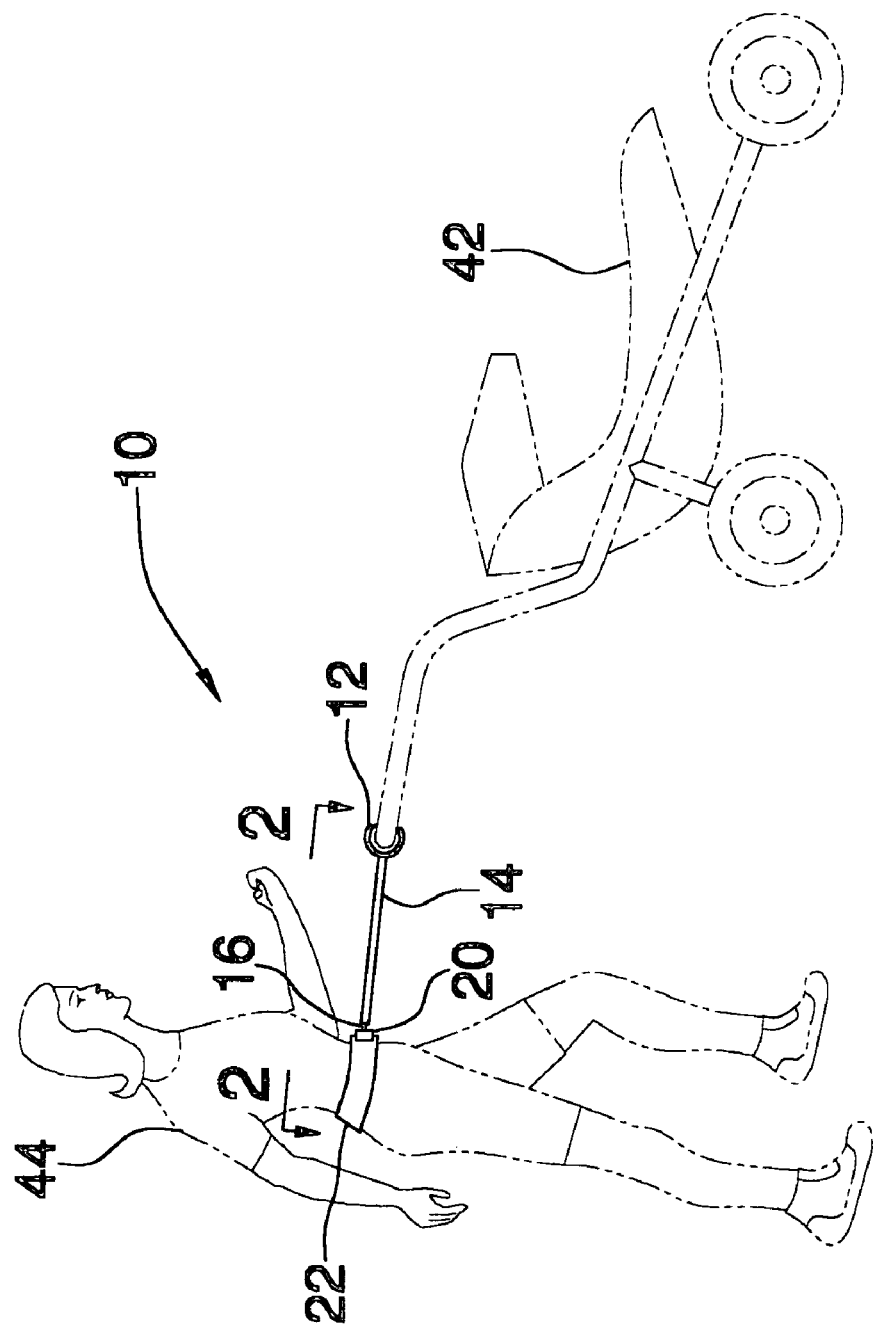
FIG. 1 is a side view of an preferred embodiment of the harness device constructed in accordance with the principles of the present invention.
Figure 5:
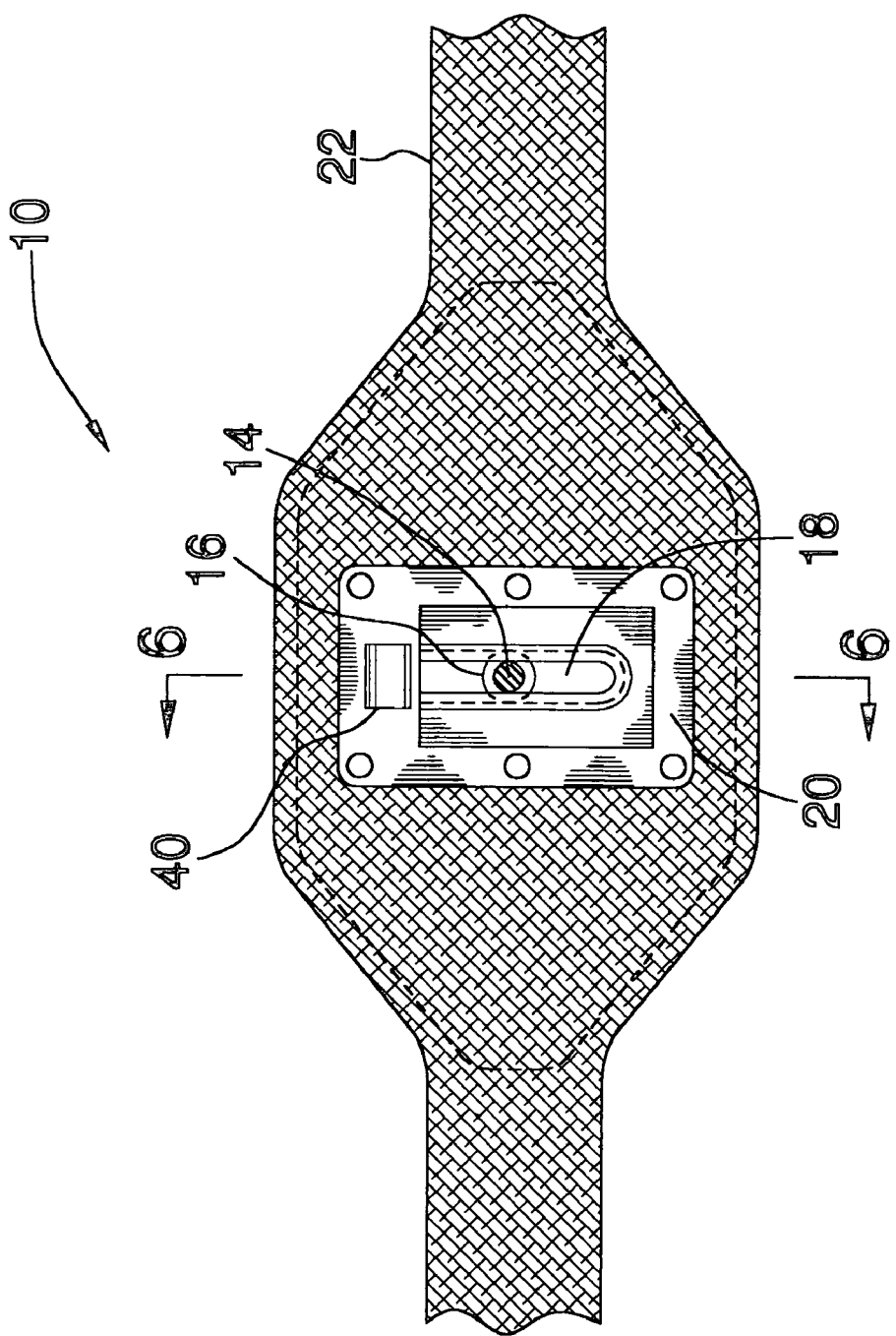
FIG. 5 is a front view of a preferred embodiment of a portion of the harness device of the present invention.
Figure 6:
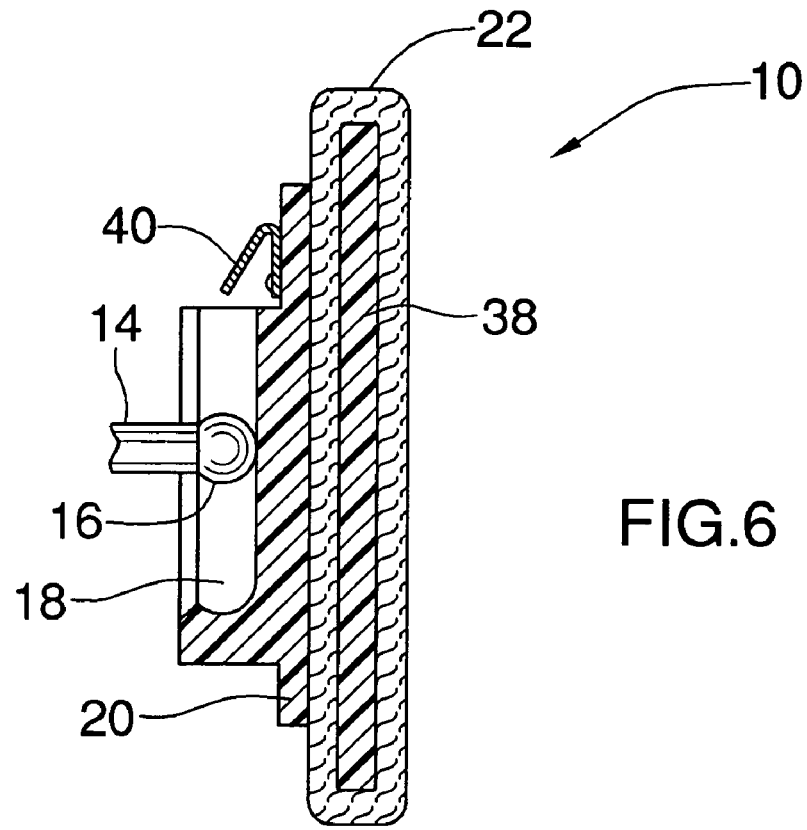
FIG. 6 is a cross sectional side view of a portion of a preferred embodiment of the harness device of the present invention.
Figure 7:
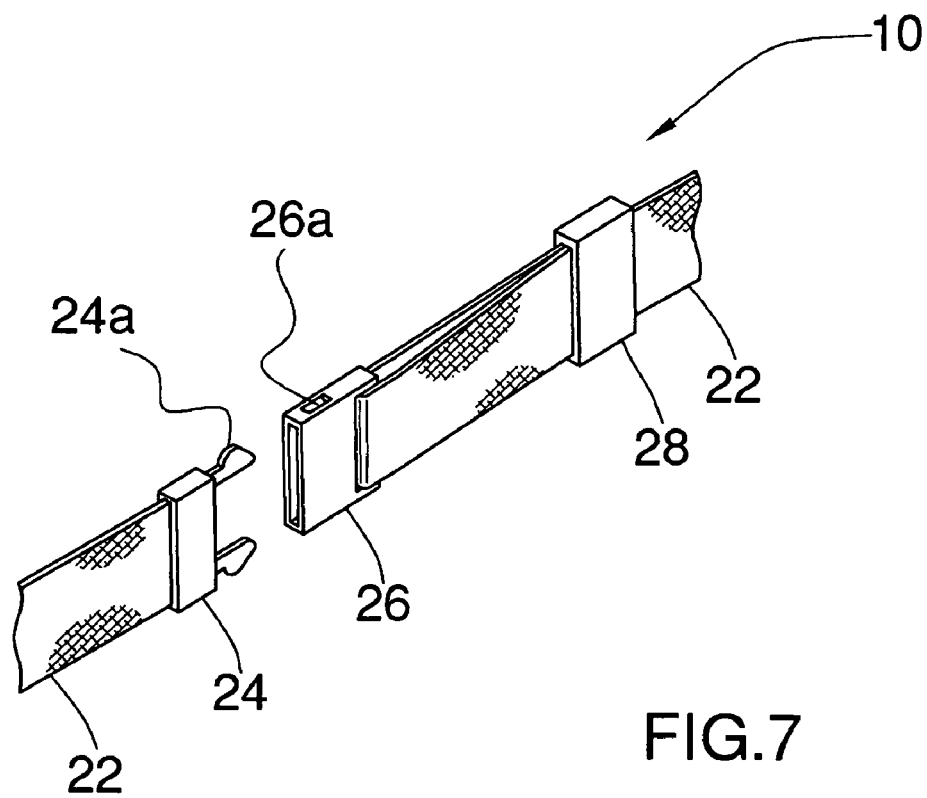
FIG. 7 is a perspective view of a portion of a preferred embodiment of the harness device of the present invention.

Referring now to the drawings, and in particular FIG. 1 to 7 thereof, one preferred embodiment of the present invention is shown and generally designated by the reference numeral 10. One preferred embodiment of a harness device 10 comprises: a clamp 12; a joining bar 14; a ball joint 16; an elongated vertical slot joint 18; a base plate 20; a waist belt 22; a first belt coupler 24; and a second belt coupler 26. The clamp 12 is attachable to a push bar of a stroller 42. The joining bar 14 is attached to the clamp 12. The ball joint 16 is attached to the joining bar 14. The elongated vertical slot joint 18 is slidably attached to the ball joint 16. The base plate 20 is attached to the vertical slot joint 18. The waist belt 22 is attached to the base plate 20. The first belt coupler 24 is attached at one end of the waist belt 22. The second belt coupler 26 is attached at another end of the waist belt 22, wherein the first and second belt couplers (24 and 26, respectively) are attachable together.

An optional belt loop 28 may be added to the device 10 in which the optional belt loop 28 is slidably attached to the waist belt 22.

An optional perpendicular shaft 30, a plurality of rigid straps 32 and a plurality of bolts 34 and nuts 36 may be added to the device 10 in which the perpendicular shaft 30 is rotatably attached to the clamp 12; the plurality of rigid straps 32 is attached to the shaft 30; and the plurality of bolts 34 and nuts 36 attached to the straps 32.

An optional pressure pad 38 may be added to the device 10 in which the optional pressure pad 38 is attached to the waist belt 22. A most preferred configuration is that the pressure pad 38 is attached internally within the waist belt 22 and that pressure pad 38 is positioned underneath the base plate 20. The pressure pad 38 may be is made of any commercially available material such as plastic selected from the group consisting of rubber, neoprene, nylon, polyvinyl chloride, polyester, polyethylene, polypropylene, polyurethanes, polyacryls, polymethacryls, cellulosic polymers, styrene-acryl copolymers, polystyrene-polyacryl mixtures, polysiloxanes, urethane-acryl copolymers, siloxane-urethane copolymers, polyurethane-polymethacryl mixtures, silicone-acryl copolymers, vinyl acetate polymers, and mixtures thereof.

An optional spring lock 40 may be added to the device 10 in which the optional spring lock 40 is attached to the base plate 20. One preferred configuration is that the spring lock 40 is a metal spring lock 40.

The clamp 12 may be any commercially available clamp. One preferred configuration is that the clamp 12 has a C-shaped cross section.

The first and second belt couplers (24 and 26, respectively) may be any commercially available coupling device as long as they are able to couple together. One preferred configuration is that the first belt coupler 24 comprises a plurality of minuscule hooks 24a and the second belt coupler 26 comprises a plurality of minuscule loops, wherein when the plurality of minuscule hooks is placed in contact with the plurality of minuscule loops 26a then a portion of the plurality of minuscule hooks is reversibly entangled with a portion of the minuscule loops. Another preferred configuration is that the first belt coupler 24 is a male snap-on buckle and the second belt coupler 26 is a snap-on female buckle.

The first and second belt couplers (24 and 26, respectively) may also be made of any commercially available material, such as plastic selected from the group consisting of rubber, neoprene, nylon, polyvinyl chloride, polyester, polyethylene, polypropylene, polyurethanes, polyacryls, polymethacryls, cellulosic polymers, styrene-acryl copolymers, polystyrene-polyacryl mixtures, polysiloxanes, urethane-acryl copolymers, siloxane-urethane copolymers, polyurethane-polymethacryl mixtures, silicone-acryl copolymers, vinyl acetate polymers, and mixtures thereof.

The waist belt 22 may be made of any durable commercially available material such as plastic selected from the group consisting of rubber, neoprene, nylon, polyvinyl chloride, polyester, polyethylene, polypropylene, polyurethanes, polyacryls, polymethacryls, cellulosic polymers, styrene-acryl copolymers, polystyrene-polyacryl mixtures, polysiloxanes, urethane-acryl copolymers, siloxane-urethane copolymers, polyurethane-polymethacryl mixtures, silicone-acryl copolymers, vinyl acetate polymers, and mixtures thereof.

One preferred embodiment of a kit for a harness device 10 comprises: a clamp 12 attachable to a push bar of a stroller 42; a joining bar 14 attached to the clamp 12; a ball joint 16 attached to the joining bar 14; an elongated vertical slot joint 18 slidably attachable to the ball joint 16; a base plate 20 attached to the vertical slot joint 18; waist belt 22 attached to the base plate 20; a first belt coupler 24 attached at one end of the waist belt 22; a second belt coupler 26 attached at another end of the waist belt 22, wherein the first and second belt couplers (24 and 26, respectively) are attachable together; and a spring lock 40 attached to the base plate 20.

An optional belt loop 28 may be added to the kit in which the optional belt loop 28 is slidably attached to the waist belt 22.

An optional pressure pad 38 may be added to the kit in which the optional pressure pad 38 is attached to the waist belt 22.

One preferred embodiment of a method of using a kit for a harness device 10, comprises the steps of: affixing, grabbing, grasping; jogging, locking, obtaining, placing, pushing, running, sliding, walking, and wrapping. The obtaining step comprises obtaining the kit comprising: a clamp 12 attachable to a push bar of a stroller 42; a joining bar 14 attached to the clamp 12; a ball joint 16 attached to the joining bar 14; an elongated vertical slot joint 18 slidably attachable to the ball joint 16; a base plate 20 attached to the vertical slot joint 18; a waist belt 22 attached to the base plate 20; a first belt coupler 24 attached at one end of the waist belt 22; a second belt coupler 26 attached at another end of the waist belt 22; a spring lock 40 attached to the base plate 20. The pushing step comprises pushing the ball joint 16 onto the spring lock 40. The sliding step comprises sliding the ball joint 16 into the vertical slot joint 18, wherein the steps of pushing and sliding constitute assembling the device 10 from the kit. The wrapping step comprises wrapping the waist belt 22 around a user's 44 torso. The grasping step comprises grasping hold of the first belt coupler 24. The grabbing step comprises grabbing hold of the second belt coupler 26. The locking step comprises locking together the first belt coupler 24 to the second belt coupler 26 so the waist belt 22 is tight around the user's torso, wherein the steps of grabbing, grasping, locking and wrapping constitute wearing the device 10. The affixing step comprises affixing the clamp 12 to the push bar of the stroller 42, wherein the steps of affixing, pushing, and sliding constitute mounting the device 10 onto the stroller 42. The placing step comprises placing an infant into the stroller 42. The walking step comprises walking while wearing the device 10 and while the device 10 is mounted onto the stroller 42. The jogging step comprises jogging while wearing the device 10 and while the device 10 is mounted onto the stroller 42. The running step comprises running while wearing the device 10 and while the device 10 is mounted onto the stroller 42.

As to the manner of usage and operation of the present invention, the same should be apparent from the above description. Accordingly, no further discussion relating to the manner of usage and operation will be provided.

While a preferred embodiment of the harness device has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Throughout this specification, unless the context requires otherwise, the word "comprise" or variations such as "comprises" or "comprising" or the term "includes" or variations, thereof, or the term "having" or variations, thereof will be understood to imply the inclusion of a stated element or integer or group of elements or integers but not the exclusion of any other element or integer or group of elements or integers. In this regard, in construing the claim scope, an embodiment where one or more features is added to any of the claims is to be regarded as within the scope of the invention given that the essential features of the invention as claimed are included in such an embodiment.

Those skilled in the art will appreciate that the invention described herein is susceptible to variations and modifications other than those specifically described. It is to be understood that the invention includes all such variations and modifications which fall within its spirit and scope. The invention also includes all of the steps, features, compositions and compounds referred to or indicated in this specification, individually or collectively, and any and all combinations of any two or more of said steps or features.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A harness device comprising:
   a clamp attachable to a push bar of a stroller;
   a joining bar attached to said clamp;
   a ball joint attached to said joining bar;
   an elongated vertical slot joint slidably attached to said ball joint;
   a base plate attached to said vertical slot joint;
   a waist belt attached to said base plate;
   a first belt coupler attached at one end of said waist belt; and
   a second belt coupler attached at another end of said waist belt, wherein said first and second belt couplers are attachable together.

2. The device of claim 1 further comprising a belt loop slidably attached to said waist belt.

3. The device of claim 1 further comprising a perpendicular shaft rotatably attached to said clamp; a plurality of rigid straps attached to said shaft; and a plurality of bolts and nuts attached to said straps.

4. The device of claim 1 further comprising a pressure pad attached to said waist belt.

5. The device of claim 1 further comprising a spring lock attached to said base plate.

6. The device of claim 5 wherein said spring lock is a metal spring lock.

7. The device of claim 1 wherein said clamp having a C-shaped cross section.

8. The device of claim 1 wherein said first belt coupler comprises a plurality of minuscule hooks; and wherein said second belt coupler comprises a plurality of minuscule loops.

9. The device of claim 8 wherein when said plurality of minuscule hooks is placed in contact with said plurality of minuscule loops then a portion of said plurality of minuscule hooks is reversibly entangled with a portion of said minuscule loops.

10. The device of claim 4 wherein said pressure pad is attached internally within said waist belt.

11. The device of claim 4 wherein said pressure pad is underneath said base plate.

12. The device of claim 4 wherein said pressure pad is made of plastic selected from the group consisting of rubber, neoprene, nylon, polyvinyl chloride, polyester, polyethylene, polypropylene, polyurethanes, polyacryls, polymethacryls, cellulosic polymers, styrene-acryl copolymers, polystyrene-polyacryl mixtures, polysiloxanes, urethane-acryl copolymers, siloxane-urethane copolymers, polyurethane-polymethacryl mixtures, silicone-acryl copolymers, vinyl acetate polymers, and mixtures thereof.

13. The device of claim 1 wherein said waist belt is made of plastic selected from the group consisting of rubber, neoprene, nylon, polyvinyl chloride, polyester, polyethylene, polypropylene, polyurethanes, polyacryls, polymethacryls, cellulosic polymers, styrene-acryl copolymers, polystyrene-polyacryl mixtures, polysiloxanes, urethane-acryl copolymers, siloxane-urethane copolymers, polyurethane-polymethacryl mixtures, silicone-acryl copolymers, vinyl acetate polymers, and mixtures thereof.

14. The device of claim 1 wherein said first belt coupler is a male snap-on buckle; and said second belt coupler is a snap-on female buckle.

15. The device of claim 1 wherein said first belt coupler is made of plastic selected from the group consisting of rubber, neoprene, nylon, polyvinyl chloride, polyester, polyethylene, polypropylene, polyurethanes, polyacryls, polymethacryls, cellulosic polymers, styrene-acryl copolymers, polystyrene-polyacryl mixtures, polysiloxanes, urethane-acryl copolymers, siloxane-urethane copolymers, polyurethane-polymethacryl mixtures, silicone-acryl copolymers, vinyl acetate polymers, and mixtures thereof.

16. The device of claim 1 wherein said second belt coupler is made of plastic selected from the group consisting of rubber, neoprene, nylon, polyvinyl chloride, polyester, polyethylene, polypropylene, polyurethanes, polyacryls, polymethacryls, cellulosic polymers, styrene-acryl copolymers, polystyrene-polyacryl mixtures, polysiloxanes, urethane-acryl copolymers, siloxane-urethane copolymers, polyurethane-polymethacryl mixtures, silicone-acryl copolymers, vinyl acetate polymers, and mixtures thereof.

17. A kit for a harness device, said kit comprising
   a clamp attachable to a push bar of a stroller;
   a joining bar attached to said clamp;
   a ball joint attached to said joining bar;
   an elongated vertical slot joint slidably attachable to said ball joint;
   a base plate attached to said vertical slot joint;
   a waist belt attached to said base plate;
   a first belt coupler attached at one end of said waist belt;
   a second belt coupler attached at another end of said waist belt, wherein said first and second belt couplers are attachable together; and
   a spring lock attached to said base plate.

18. The kit of claim 17 further comprising a belt loop slidably attached to said waist belt.

19. The kit of claim 17 further comprising a pressure pad attached to said waist belt.

20. A method of using a kit for a harness device, said method comprising the steps of:
   obtaining the kit comprising:
      a clamp attachable to a push bar of a stroller;
      a joining bar attached to the clamp;
      a ball joint attached to the joining bar;
      an elongated vertical slot joint slidably attachable to the ball joint;
      a base plate attached to the vertical slot joint;
      a waist belt attached to the base plate;
      a first belt coupler attached at one end of the waist belt;
      a second belt coupler attached at another end of the waist belt; and
      a spring lock attached to the base plate;
   pushing the ball joint onto the spring lock;
   sliding the ball joint into the vertical slot joint, wherein said steps of pushing and sliding constitute assembling the device from the kit;
   wrapping the waist belt around a user's torso;
   grasping hold of the first belt coupler;
   grabbing hold of the second belt coupler;
   locking together the first belt coupler to the second belt coupler so the waist belt is tight around the user's torso, wherein said steps of grabbing, grasping, locking and wrapping constitute wearing the device;
   affixing the clamp to the push bar of the stroller, wherein said steps of affixing, pushing, and sliding constitute mounting the device onto the stroller;
   placing an infant into the stroller;
   walking while wearing the device and while the device is mounted onto the stroller;
   jogging while wearing the device and while the device is mounted onto the stroller; and
   running while wearing the device and while the device is mounted onto the stroller.

* * * * *